United States Patent
Zhang et al.

(10) Patent No.: US 10,171,458 B2
(45) Date of Patent: Jan. 1, 2019

(54) WIRELESS PAIRING AND COMMUNICATION BETWEEN DEVICES USING BIOMETRIC DATA

(71) Applicant: Apple Inc., Cupertino, CA (US)

(72) Inventors: Chang Zhang, Cupertino, CA (US); Qing Liu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 160 days.

(21) Appl. No.: 15/053,590

(22) Filed: Feb. 25, 2016

(65) Prior Publication Data

US 2016/0182507 A1 Jun. 23, 2016

Related U.S. Application Data

(63) Continuation-in-part of application No. 13/601,829, filed on Aug. 31, 2012, now abandoned.

(51) Int. Cl.
*H04L 29/06* (2006.01)
*G06F 21/32* (2013.01)
(Continued)

(52) U.S. Cl.
CPC .......... *H04L 63/0861* (2013.01); *G06F 21/32* (2013.01); *G06F 21/44* (2013.01); *H04M 1/7253* (2013.01); *H04W 12/06* (2013.01); *H04L 63/108* (2013.01); *H04L 67/1095* (2013.01); *H04M 2250/64* (2013.01)

(58) Field of Classification Search
None
See application file for complete search history.

(56) References Cited

U.S. PATENT DOCUMENTS 6,167,517 A 12/2000 Gilchrist et al.
7,378,939 B2 5/2008 Sengupta et al.
(Continued)

FOREIGN PATENT DOCUMENTS

CN 1809792 7/2006
CN 1918584 2/2007
(Continued)

OTHER PUBLICATIONS

U.S. Appl. No. 13/601,829, filed Aug. 31, 2012, Zhang et al.
U.S. Appl. No. 14/871,387, filed Sep. 30, 2015, Bradley et al.

*Primary Examiner* — Michael R Vaughan
(74) *Attorney, Agent, or Firm* — Brownstein Hyatt Farber Schreck, LLP

(57) ABSTRACT

In a first implementation, a host determines to pair with a device and transmits biometric data for a user to the device. The device receives the transmitted biometric data and compares such to device biometric data to determine whether or not to pair with the host and/or what data stored by the device to allow the host to access. The host then accesses data of the device to which the device has allowed access. In another implementation, a device determines to pair with a host and transmits biometric data for a user to the host. The host receives the transmitted biometric data and compares such to device biometric data to determine whether or not to pair with the device and/or what data stored by the host to allow the device to access. The device then accesses data of the host to which the host has allowed access.

22 Claims, 12 Drawing Sheets

(51) Int. Cl.
*G06F 21/44* (2013.01)
*H04M 1/725* (2006.01)
*H04W 12/06* (2009.01)
*H04L 29/08* (2006.01)

(56) References Cited

U.S. PATENT DOCUMENTS

| | | |
|---|---|---|
| 7,623,659 B2 | 11/2009 | Huang et al. |
| 7,865,140 B2 | 1/2011 | Levien et al. |
| 7,925,022 B2 | 4/2011 | Jung et al. |
| 8,027,518 B2 | 9/2011 | Baker et al. |
| 8,190,129 B2 | 5/2012 | Ben Ayed |
| 8,244,211 B2 | 8/2012 | Clark |
| 8,370,640 B2 | 2/2013 | Adams et al. |
| 8,433,919 B2 | 4/2013 | Giobbi et al. |
| 8,438,647 B2 | 5/2013 | Jevans |
| 8,467,770 B1 | 6/2013 | Ben Ayed |
| 8,473,748 B2 | 6/2013 | Sampas |
| 8,694,784 B1 | 4/2014 | Lekies |
| 8,854,966 B2 | 10/2014 | Fadell |
| 8,994,498 B2 | 3/2015 | Agrafioti et al. |
| 9,032,493 B2 | 5/2015 | Lortz et al. |
| 9,158,906 B2 | 10/2015 | Guajardo Merchan et al. |
| 9,203,819 B2 | 12/2015 | Fenton et al. |
| 9,264,897 B2 | 2/2016 | Ge et al. |
| 9,270,671 B2 | 2/2016 | Bonazzoli et al. |
| 9,298,905 B1 | 3/2016 | Giobbi |
| 9,363,108 B2 | 6/2016 | Bell et al. |
| 9,407,619 B2 | 8/2016 | Tunnell et al. |
| 9,503,894 B2 | 11/2016 | Shanmugam et al. |
| 2002/0056043 A1 | 5/2002 | Glass |
| 2007/0050303 A1 | 3/2007 | Schroeder et al. |
| 2007/0101434 A1* | 5/2007 | Jevans .................. G06F 21/32 726/26 |
| 2007/0150415 A1 | 5/2007 | Bundy et al. |
| 2009/0203355 A1* | 8/2009 | Clark .................. G06F 21/32 455/411 |
| 2011/0047384 A1 | 2/2011 | Jacobs et al. |
| 2011/0106954 A1* | 5/2011 | Chatterjee ............. G06F 1/1632 709/227 |
| 2011/0314153 A1 | 12/2011 | Bathiche et al. |
| 2012/0042087 A1* | 2/2012 | Berg ..................... H04L 63/08 709/229 |
| 2012/0143707 A1 | 6/2012 | Jain |
| 2012/0254987 A1 | 10/2012 | Ge et al. |
| 2013/0036017 A1* | 2/2013 | Galloway ........ G06Q 20/40145 705/16 |
| 2013/0179944 A1 | 7/2013 | Kozlay et al. |
| 2013/0198516 A1* | 8/2013 | Fenton .............. H04L 63/0869 713/168 |
| 2013/0298208 A1* | 11/2013 | Ayed ..................... G06F 21/00 726/6 |
| 2014/0046664 A1 | 2/2014 | Sarkar et al. |
| 2014/0068725 A1 | 3/2014 | Zhang et al. |
| 2014/0068744 A1 | 3/2014 | Bran et al. |
| 2014/0129843 A1 | 5/2014 | Shi et al. |
| 2015/0077224 A1 | 3/2015 | Pal |
| 2015/0163221 A1 | 6/2015 | Bolin et al. |
| 2015/0186636 A1 | 7/2015 | Tharappel et al. |
| 2016/0094550 A1 | 3/2016 | Bradley et al. |

FOREIGN PATENT DOCUMENTS

| | | |
|---|---|---|
| CN | 101124769 | 2/2008 |
| CN | 101208701 | 6/2008 |
| CN | 101467204 | 6/2009 |
| CN | 101933051 | 12/2010 |
| CN | 101946472 | 1/2011 |
| CN | 102255896 | 11/2011 |
| CN | 102263643 | 11/2011 |
| CN | 102292731 | 11/2011 |
| CN | 103310142 | 9/2013 |
| CN | 103890768 | 6/2014 |
| CN | 103907328 | 7/2014 |
| TW | M415369 | 11/2011 |
| WO | WO 98/012670 | 3/1998 |
| WO | WO 9812670 A1 * | 3/1998 ............ G06F 21/32 |
| WO | WO 06/128171 | 11/2006 |

* cited by examiner

WIRELESS PAIRING AND COMMUNICATION BETWEEN DEVICES USING BIOMETRIC DATA

CROSS REFERENCE TO RELATED APPLICATION

This application is a continuation-in-part of U.S. patent application Ser. No. 13/601,829, filed Aug. 31, 2012, entitled "Wireless Pairing and Communication Between Devices Using Biometric Data," the contents of which are incorporated by reference as if fully disclosed herein.

FIELD OF THE INVENTION

This disclosure relates generally to communication between devices, and more specifically to use of biometrics in wireless pairing and communication between devices.

BACKGROUND

Given the prevalence of electronic devices (such as desktop computers, mobile computing devices, portable data storage devices, smart phones, digital music players, and so on) that store data in the modern world, many users may own and/or utilize more than one such electronic device. As such, users may need to wirelessly transfer data (such as music files, preference files, configuration files, document files, movie files, image files, and so on) back and/or forth between the storage media of various such electronic devices in order to make full use out of the electronic devices. In order to control the use of such electronic devices and/or the security of data stored by such electronic devices, electronic devices may need to perform one or more 'pairing' operations before data transfer can be performed. However, in order to provide access control and/or security, such pairing processes may be time consuming and/or otherwise burdensome for users.

For example, electronic devices may be configured to pair and/or communicate data utilizing a Bluetooth® communication connection. However, in order to configure the devices to pair and/or communicate utilizing the Bluetooth® communication connection a user may be required to enter one or more passcodes into one or more of the electronic devices. Such a manual configuration and/or passcodes entry system may be inconvenient for users. Users may not want to remember passcodes and/or have to enter such passcodes or similar security measures in order to transfer data between different electronic devices.

SUMMARY

The present disclosure discloses systems, methods, and computer program products for wireless pairing and communication between devices using biometrics. In various implementations, a host may determine to pair with at least one device and transmit biometric data for a user of the host to the device. The device may receive the transmitted biometric data. The device may compare such biometric data to biometric data stored in the device to determine whether or not to pair with the host and/or what data stored by the device to allow the host to access. The host may then access data of the device to which the device has allowed access based on the transmitted biometric data.

Similarly, in one or more implementations, a device may determine to pair with at least one host. As such, the device may transmit biometric data for a user of the device to the host. The host may receive the transmitted biometric data and compare such to the host's biometric data. Based on the comparison, the host may determine whether or not to pair with the device and/or what data stored by the host to allow the device to access. The device may then access data of the host to which the host has allowed access based on the transmitted biometric data.

Hosts or devices may pair with devices or hosts (respectively) in order to perform a variety of activities. For example, a device may pair with a host to obtain configuration files in order to configure itself to more closely resemble the configuration of the host, backup files stored by the device on the host, obtain files stored by the host, synchronize files stored on both the device and the host, and so on.

In some implementations, the host or device may simply transmit biometric data. However, in other implementations, the host or device may modify biometric data before transmission, such as by hashing and/or encryption. Such biometric data may include any kind of biometric data, such as fingerprints, handprints, thumb prints, facial images, retinal images, voice signatures, and so on.

In various implementations, the host or device may automatically pair with an available device or host (respectively) as long as the biometric data matches. However, in other implementations, user input indicating to pair (which may include providing of the biometric data) may be required by the host or device requesting the pairing and/or the device or host accepting the pairing.

In one or more implementations, the host or device which allows access to data may simply allow access to any stored data as long as the biometric data matches. However, in other implementations, the host or device may maintain a variety of different permission levels for a variety of different areas of stored data (such as master/owner for secured areas or guest/non-owner for non-secured areas). In such implementations, the host or device may also associate the permission levels with the biometric data. As such, the host or device when paired may only allow access (and/or type of access) corresponding to the permissions associated with the biometric data.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

The present disclosure discloses systems, methods, and computer program products for wireless pairing and communication between devices using biometrics. In various implementations, a host (such as a desktop computer, a laptop computer, a smart phone, a cellular phone, a personal digital assistant, a tablet computer, a digital music player, a digital video player, a cloud computing storage server, and/or other such computing device) may determine to pair with at least one device (such as a portable storage device, a desktop computer, a laptop computer, a smart phone, a cellular phone, a personal digital assistant, a tablet computer, a digital music player, a digital video player, a cloud computing storage server, and/or other such device that stores data). As such, the host may transmit biometric data (such as one or more fingerprints, facial images, retinal images, handprints, thumb prints, voice samples, and so on) for a user of the host to the device. The device may receive the transmitted biometric data and compare such to device biometric data to determine whether or not to pair with the host and/or what data stored by the device to allow the host to access. The host may then access data of the device to which the device has allowed access based on the transmitted biometric data.

Similarly, in one or more implementations, a device may determine to pair with at least one host. As such, the device may transmit biometric data for a user of the device to the host. The host may receive the transmitted biometric data and compare such to host biometric data to determine whether or not to pair with the device and/or what data stored by the host to allow the device to access. The device may then access data of the host to which the host has allowed access based on the transmitted biometric data.

Figure 1:
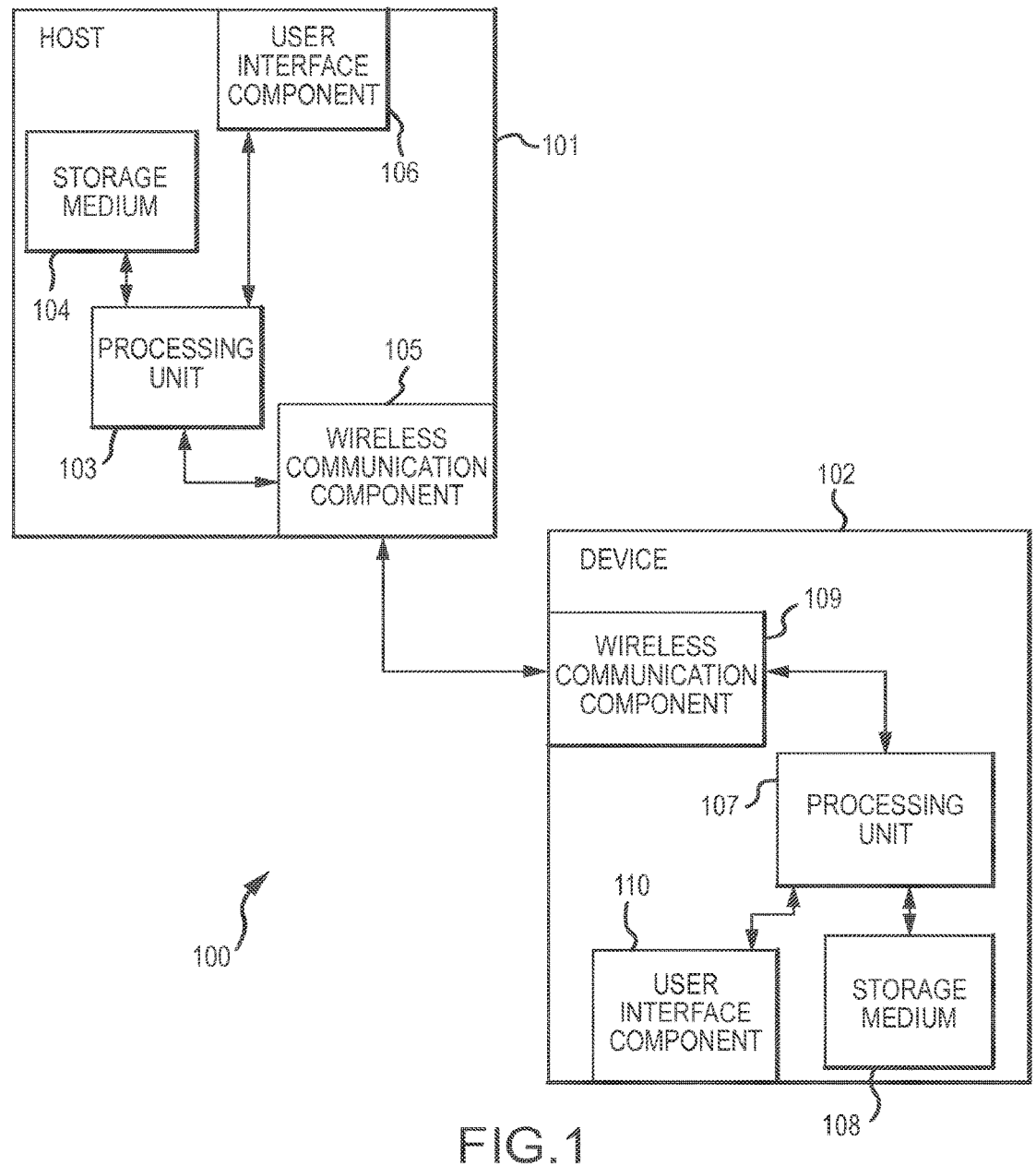
FIG. 1 is a block diagram illustrating a system for wireless pairing and communication between devices using biometrics.

FIG. 1 is a block diagram illustrating a system 100 for wireless pairing and communication between devices using biometrics. The system 100 includes a host 101 and a device 102 that are operable to wirelessly communicate with each other. The host may be a computing device such as a desktop computer, a laptop computer, a smart phone, a cellular phone, a personal digital assistant, a tablet computer, a digital music player, a digital video player, a cloud computing storage server, and/or other such computing device. Additionally, although the host is illustrated and described as a single computing device, in some implementations the host may comprise a plurality of computing devices such as computing devices configured in a cloud computing arrangement. The device may be any electronic device that is operable to store data such as a portable storage device, a desktop computer, a laptop computer, a smart phone, a cellular phone, a personal digital assistant, a tablet computer, a digital music player, a digital video player, a cloud computing storage server, and/or other such device that stores data. Additionally, although the device is illustrated and described as a single device, in some implementations the host may comprise a plurality of devices such as devices configured in a cloud computing arrangement.

The host 101 may include one or more processing units 103, one or more non-transitory storage media 104 (which may take the form of, but is not limited to, a magnetic storage medium; optical storage medium; magneto-optical storage medium; read only memory; random access memory; erasable programmable memory; flash memory; and so on), and/or one or more wireless communication components 105. The host may also include one or more user interface components 106 that are operable to interface with one or more input/output components such as one or more displays, touch screens, keyboards, keypads, touch pads, mice, biometric readers (such as one or more fingerprint readers for capturing one or more fingerprints, thumb prints, palm prints, hand prints and so on; one or more cameras for capturing one or more facial images, retinal images, and so on; one or more microphones for capturing one or more voice signatures and so on; and so on), printers, and/or other such input/output components. The processing unit 103 may execute one or more instructions stored in the non-transitory storage medium 104 to perform one or more host operations such as communicate with the device 102.

Similarly, the device 102 may include one or more processing units 107, one or more non-transitory storage media 108, and/or one or more wireless communication components 109. The device may also include one or more user interface components 110 that are operable to interface with one or more input/output components. The processing unit 107 may execute one or more instructions stored in the non-transitory storage medium 108 to perform one or more device operations such as communicate with the host 101.

In one or more implementations, the host 101 may determine to pair with the device 102. The host may make such a determination based on a variety of different factors such as detection that the device is available for pairing (such as when the host is brought into sufficient proximity to the device, when the host connects to a network through which the device is accessible, and so on), receiving an input from the user indicating to pair with the device (which may be received in response to a prompt indicating that the device is available for pairing), and so on. Upon determining to pair with the device, the host may transmit biometric data for a user of the host to the device. Such biometric data may be stored in the non-transitory medium 104 (and may be associated with one or more logins, accounts, and so on associated with the user currently utilizing the host) and/or may be obtained from the user via the user interface component 106.

When the device 102 receives the biometric data transmitted by the host 101, the device may compare the transmitted biometric data with biometric data stored in the non-transitory storage medium 108 and/or obtained from a user of the device 102 via the user interface component 110. If the comparison results in a match, (and/or receipt of user input indicating to pair with the host), the device may determine to pair with the host and/or allow access to data stored in the non-transitory storage medium 108. In some cases, the data to which the device allows access may be determined based on one or more permissions associated with the biometric data.

After the device 102 allows access, the host 101 may access the data in order to achieve one or more of a variety of different purposes. In various cases, the host may access the data in order to transfer data from the non-transitory storage medium 108 to the non-transitory storage medium 104 (such as to obtain one or more files for the host, synch one or more files of the host with one or more files of the device, and so on), obtain one or more configuration or preference files which may be utilized to configure the host, alter data stored in the non-transitory storage medium 108, transfer data from the non-transitory storage medium 104 to the non-transitory storage medium 108, and so on.

In various implementations, the device 102 may maintain areas of storage in the storage medium 108 of differing security levels. For example, the storage medium 108 may include a public (or unsecured) storage area and a private (or secured) storage area. In this example, the device may allow the host 101 access to the public storage area as long as the host has been allowed to pair with the device. However, the device may not allow a paired host to access the private storage area unless the biometric data received from the host is associated with sufficient permissions on the device. For example, the device may include master (or device owner) level permissions and guest (or non-owner) level permissions. The device may allow a paired host to access the private storage area if the biometric data received from the host is associated with master level permissions. However, if the biometric data received from the host is associated with guest level permissions then the device may only allow the paired host to access the public storage area.

In one or more implementations, the host 101 may transmit the biometric data to the device 102 without modifying the biometric data. However, in other implementations the host may modify the biometric data before transmission. For example, instead of transmitting the biometric data in its entirety, the host may generate a hash value from the biometric data and/or encrypt the biometric data before transmission and the device may compare the hashed and/or encrypted biometric data with a hashed and/or version of biometric data stored by the device. In this way user biometric data may be protected, communication connection bandwidth usage may be minimized, and so on.

In some implementations, after the host 101 and device 102 have paired they may remain paired unless wireless communication between the host and device are interrupted. However, in other implementations either the host or the device may un-pair if a timeout period (such as two minutes) elapses since the last communication between the host and device (such as the last time the host accessed data of the device). In such cases, the user may be able to extend the timeout period, such as by responding to a presented prompt that the timeout period is about to elapse. Yet another implementation would be to have a longer timeout period and allow the user to shorten the timeout period by requesting to terminate the connection via the user interface 106 of the host and/or the user interface 110 of the device.

When the host 101 and device 102 have paired and wireless communication between the host and device is interrupted (such as when the host and device are no longer within sufficient proximity for wireless communication to occur), the host and device may un-pair. In some implementations, when the host and device are again able to communicate wirelessly after un-pairing, the host and device may be required to re-pair before additional wireless communication between the host and device can be performed. However, in other cases the host and device may not be required to re-pair before additional wireless communication between the host and device can be performed. In either case, in some implementations operations that were interrupted by interruption of the wireless communication (such as a partially completed file transfer) may be resumed or restarted.

Although the host 101 and device 102 are described above as storing biometric data and/or receiving biometric data from a user, it is understood that other configurations are possible and contemplated. For example, the device may receive (and/or store) such biometric data from another device, such as the host.

Although system 100 is illustrated and described above in the context of the host pairing with the device and the device allowing device data access to the host, it is understood that this is an example implementation. In other implementations the device may pair with the device and the host may allow host data access to the device based on biometric data. In still other implementations both the host and device may seek to pair with each other and allow data access to each other based on exchanged biometric data.

Figure 2:
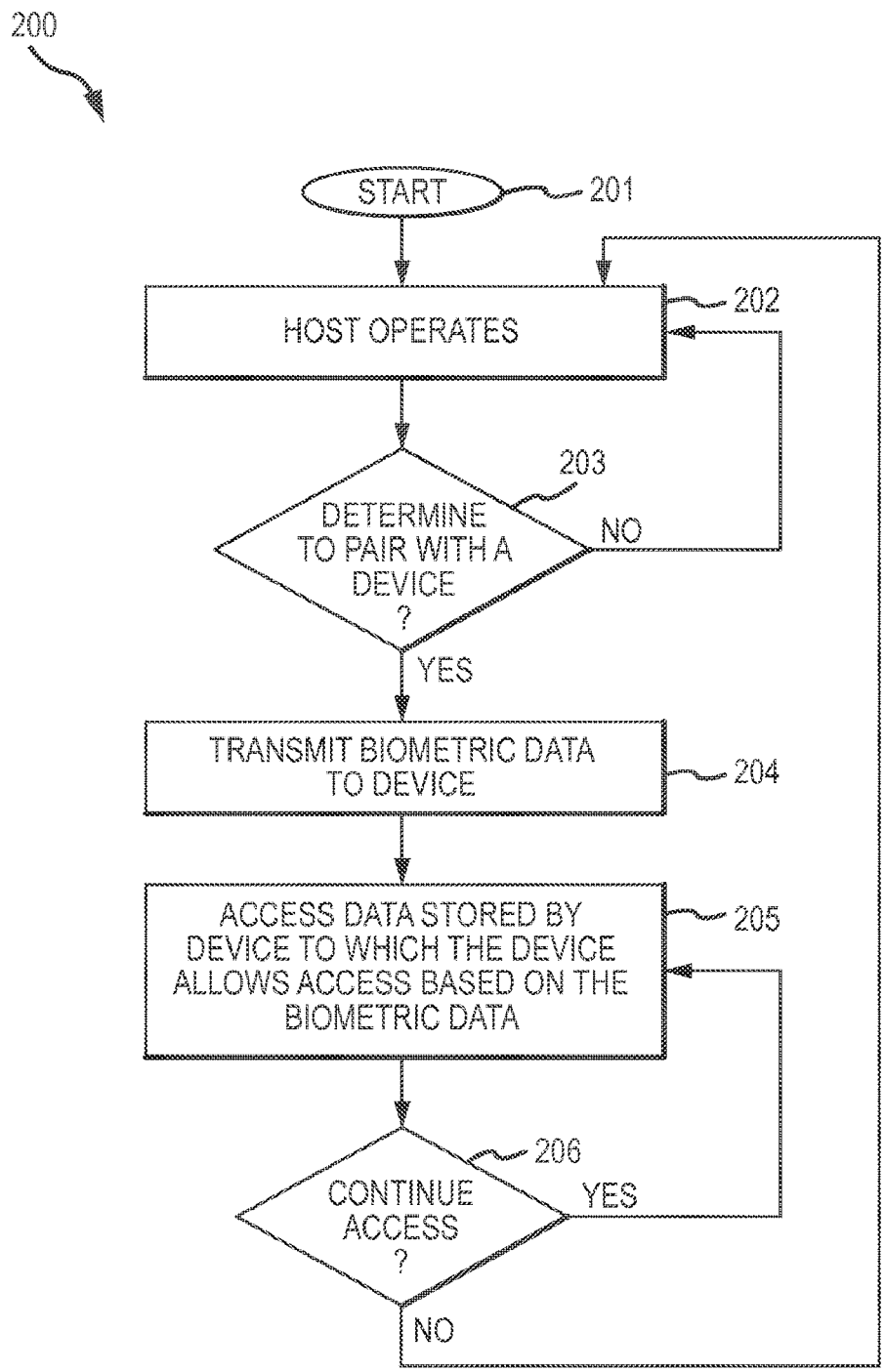
FIG. 2 is a flow chart illustrating a first example method for wireless pairing and communication between devices using biometrics. This method may be performed by the host of FIG. 1.

FIG. 2 illustrates a first example method 200 for wireless pairing and communication between devices using biometrics. The method 200 may be performed by the host 101 of FIG. 1. The flow begins at block 201 and proceeds to block 202 where the host operates. The flow then proceeds to block 203 where the host determines whether or not to pair with a device. If so, the flow proceeds to block 204. Otherwise, the flow returns to block 202 where the host continues to operate.

At block 204, after the host 101 determines to pair with a device, the host transmits biometric data to the device. The flow then proceeds to block 205 where the host accesses data stored by the device to which the device allows the host access based on the transmitted biometric data. Then the flow proceeds to block 206.

At block 206, the host 101 determines whether not to continue accessing the data to which the device has allowed access. If so, the flow returns to block 205 where the host continues to access the data. Otherwise, the flow returns to block 202 where the host continues to operate.

Figure 3:
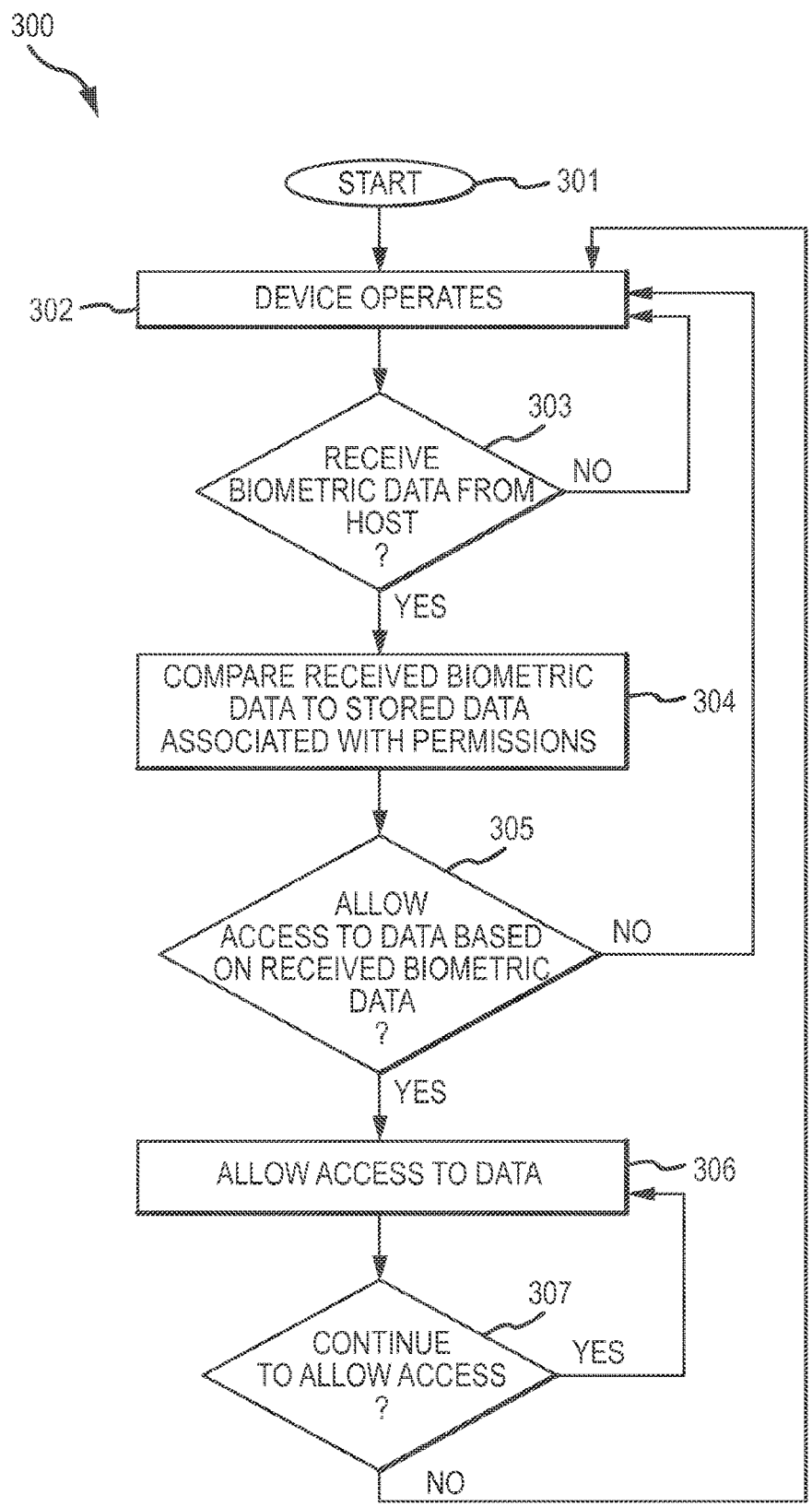
FIG. 3 is a flow chart illustrating a second example method for wireless pairing and communication between devices using biometrics. This method may be performed by the device of FIG. 1.

FIG. 3 illustrates a second example method 300 for wireless pairing and communication between devices using biometrics. The method 300 may be performed by the device 102 of FIG. 1. The flow begins at block 301 and proceeds to block 302 where the device operates. The flow then proceeds to block 303 where the device determines whether or not biometric data is received from a host. If so, the flow proceeds to block 304. Otherwise, the flow returns to block 302 where the device continues to operate.

At block 304, after the device 102 has determined that biometric data is received from a host, the device compares the received biometric data to stored biometric data that is associated with permissions regarding the device. The flow then proceeds to block 305 where the device determines whether or not to allow access to data of the device based on the received biometric data. If so, the flow proceeds to block 306. Otherwise, the flow returns to block 302 and the device continues to operate.

At block 306, after the device 102 determines to allow access to data of the device based on the received biometric data, the device allows the host to access the data. The flow then proceeds to block 307.

At block 307 the device 102 determines whether or not to continue to allow the host to access the data. If so, the flow returns to block 306 and the device continues to allow the host to access the data. Otherwise, the flow returns to block 302 and the device continues to operate.

Figure 4:
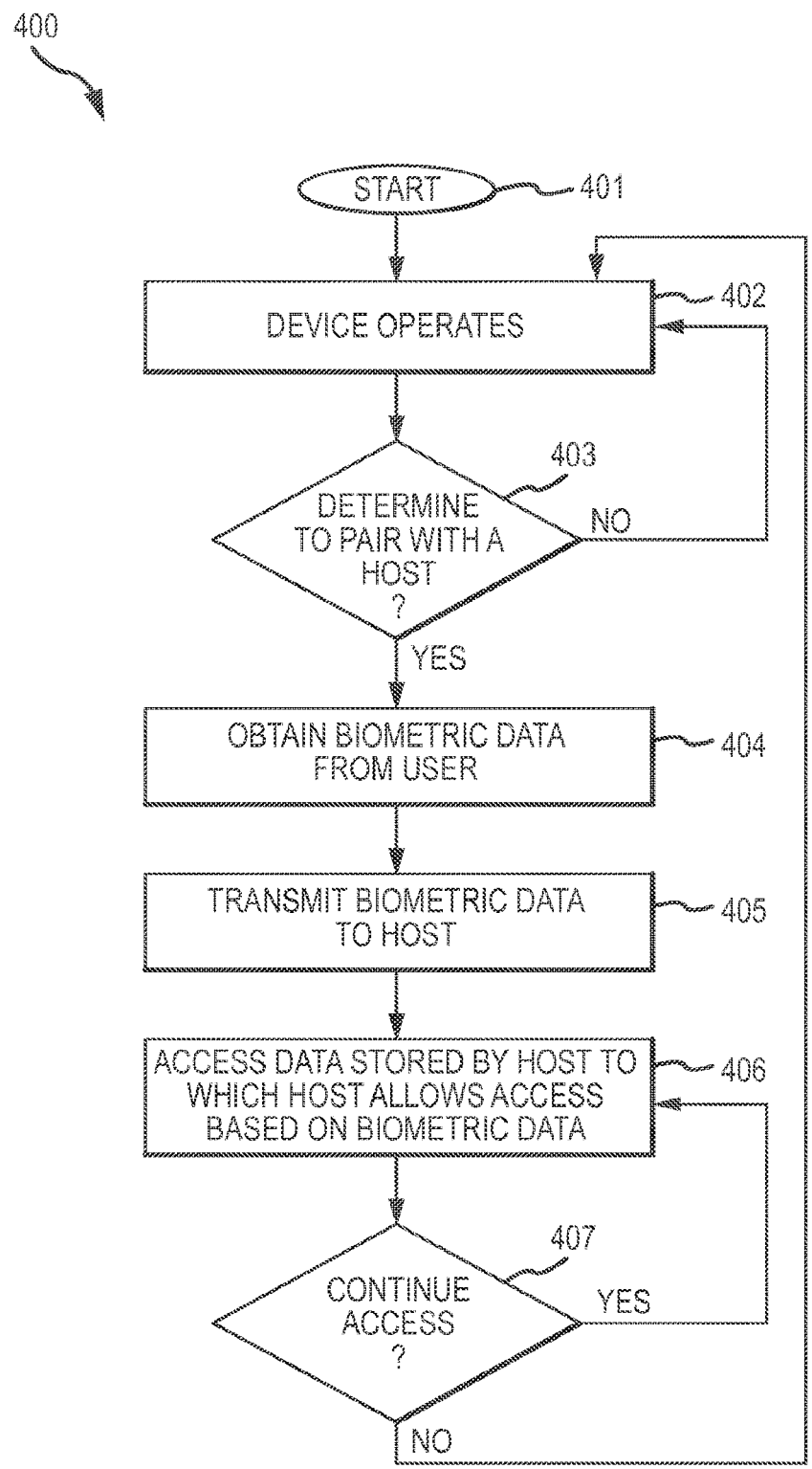
FIG. 4 is a flow chart illustrating a third example method for wireless pairing and communication between devices using biometrics. This method may be performed by the device of FIG. 1.

FIG. 4 illustrates a third example method 400 for wireless pairing and communication between devices using biometrics. The method 400 may be performed by the device 102 of FIG. 1. The flow begins at block 401 and proceeds to block 402 where the device operates. The flow then proceeds to block 403 where the device determines whether or not to pair with a host. If so, the flow proceeds to block 404. Otherwise, the flow returns to block 402 where the device continues to operate.

At block 404, after the device 102 determines to pair with a host, the device obtains biometric data for a user via one or more biometric readers. The flow then proceeds to block 405 where the device transmits the obtained biometric data to the host. Next, flow proceeds to block 406 where the device accesses data stored by the host to which the host allows access based on the transmitted biometric data. The flow then proceeds to block 407.

At block 407, the device 102 determines whether or not to continue accessing the data. If so, the flow returns to block 406 where the device continues to access the data to which the host allows access. Otherwise, the flow returns to block 402 where the device continues to operate.

Figure 5:
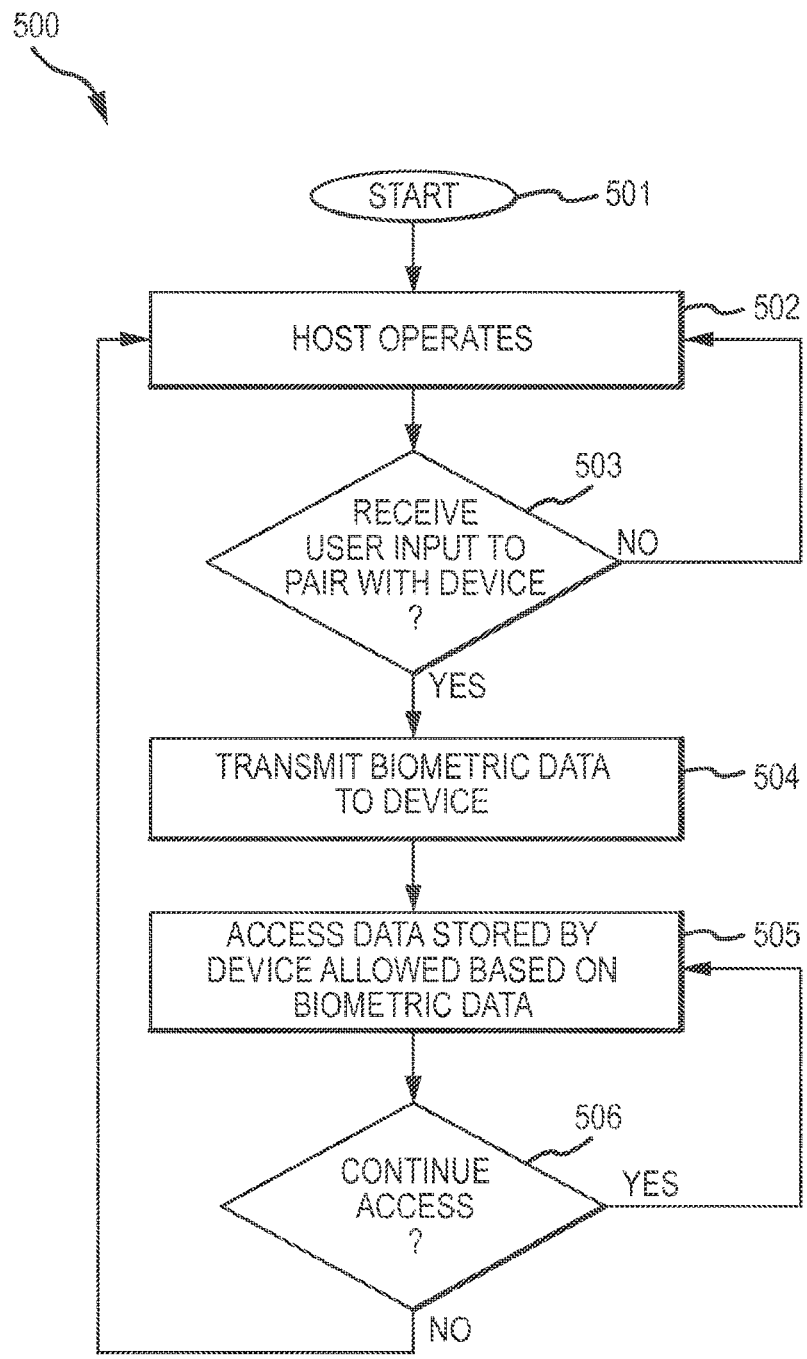
FIG. 5 is a flow chart illustrating a fourth example method for wireless pairing and communication between devices using biometrics. This method may be performed by the host of FIG. 1.

FIG. 5 illustrates a fourth example method 500 for wireless pairing and communication between devices using biometrics. The method 500 may be performed by the host 101 of FIG. 1. The flow begins at block 501 and proceeds to block 502 where the host operates. The flow then proceeds to block 503 where the host determines whether or not user input is received indicating to pair with a device. Such user input may be received in response to a prompt presented by the host indicating that a device is available for pairing. If so, the flow proceeds to block 504. Otherwise, the flow returns to block 502 where the host continues to operate.

At block 504, after the host 101 determines that user input is received indicating to pair with a device, the host transmits biometric data to the device. The flow then proceeds to block 505 where the host accesses data stored by the device to which the device allows access based on the transmitted biometric data. The flow then proceeds to block 506.

At block 506, the host 101 determines whether or not to continue accessing the data. If so, the flow returns to block 505 where the host continues to access the data to which the device allows access. Otherwise, the flow returns to block 502 where the host continues to operate.

Figure 6:
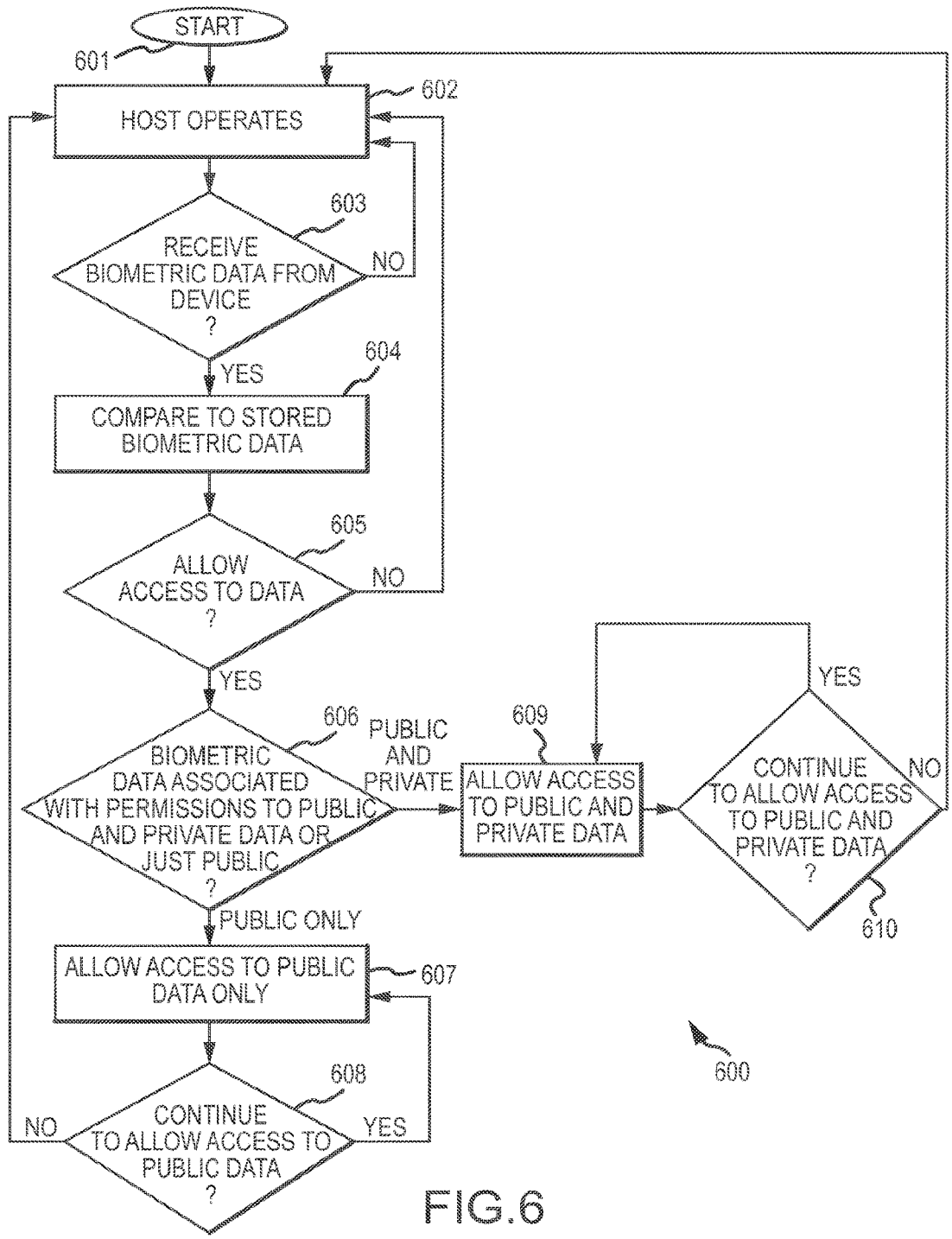
FIG. 6 is a flow chart illustrating a fifth example method for wireless pairing and communication between devices using biometrics. This method may be performed by the host of FIG. 1.

FIG. 6 illustrates a fifth example method 600 for wireless pairing and communication between devices using biometrics. The method 600 may be performed by the host 101 of FIG. 1. The flow begins at block 601 and proceeds to block 602 where the host operates. The flow then proceeds to block 603 where the host determines whether or not biometric data is received from a device. If so, the flow proceeds to block 604. Otherwise, the flow returns to block 602 where the host continues to operate.

At block 604, after the host 101 determines that biometric data from a device is received, the host compares the received biometric data to stored biometric data. The flow then proceeds to block 605 where the host determines whether or not to allow the device access to data of the host based on the comparison. If so, the flow proceeds to block 606. Otherwise, the flow returns to block 602 where the host continues to operate.

At block 606, after the host 101 determines to allow the device access to data of the host, the host determines whether permissions of the host associated with the biometric data are associated with access to at least a public data area of the host (non-secure area) and a private data area of the host (secure area) (master or owner level access) or are associated with access to only the public data area (guest or non-owner level access). If the permissions are associated with access to only the public data area, the flow proceeds to block 607. Otherwise, the flow proceeds to block 609.

At block 607, after the host 101 determines that the permissions are associated with access to only the public data area, the host allows the device to access the public data area. The flow then proceeds to block 608 where the host determines whether or not to continue allowing access to the public data area. If so, the flow returns to block 607 where the host continues to allow the device to access the public data area. Otherwise, the flow returns to block 602 where the host continues to operate.

At block 609, after the host 101 determines that the permissions are associated with access to the public data area and the private data area, the host allows the device to access the public data area and the private data area. The flow then proceeds to block 610 where the host determines whether or not to continue allowing access to the public data area and the private data area. If so, the flow returns to block 609 where the host continues to allow the device to access the public data area and the private data area. Otherwise, the flow returns to block 602 where the host continues to operate.

Figure 7:
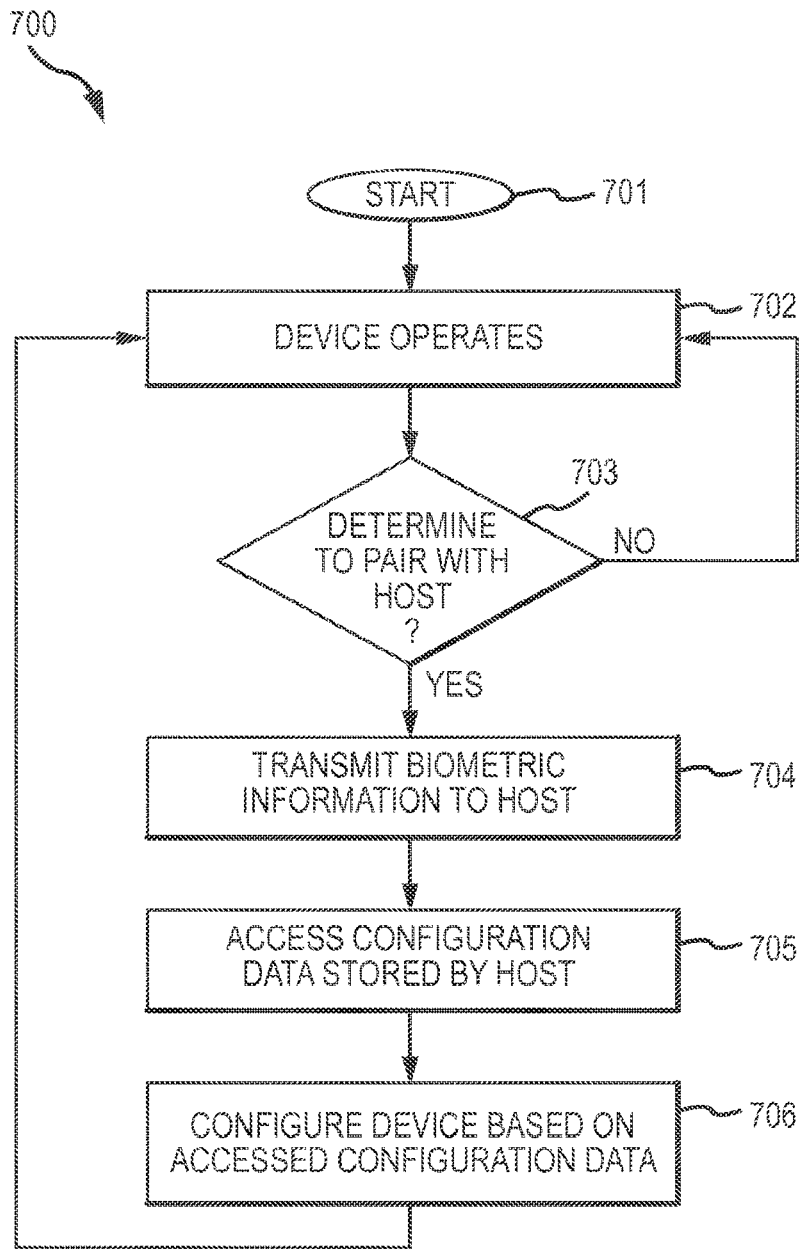
FIG. 7 is a flow chart illustrating a sixth example method for wireless pairing and communication between devices using biometrics. This method may be performed by the device of FIG. 1.

FIG. 7 illustrates a sixth example method 700 for wireless pairing and communication between devices using biometrics. The method 700 may be performed by the device 102 of FIG. 1. The flow begins at block 701 and proceeds to block 702 where the device operates. The flow then proceeds to block 703 where the device determines whether or not to pair with a host. If so, the flow proceeds to block 704. Otherwise, the flow returns to block 702 where the device continues to operate.

At block 704, after the device 102 determines to pair with a host, the device transmits biometric data to the host. The flow then proceeds to block 705 where the device accesses configuration data stored by the host to which the host allows access based on the biometric data. Then the flow proceeds to block 706.

At block 706, the device 102 configures itself based on the accessed configuration data. Such configuration may include setting one or more background images, display settings, sound settings, language settings, alert settings, user preferences, defaults, browser bookmarks, navigation items (such as items included in a 'dock'), and so on. By configuring itself based on the configuration data obtained from the host, the device may alter itself to more closely resemble the configuration of the host. The flow then returns to block 702 where the device continues to operate.

Figure 8:
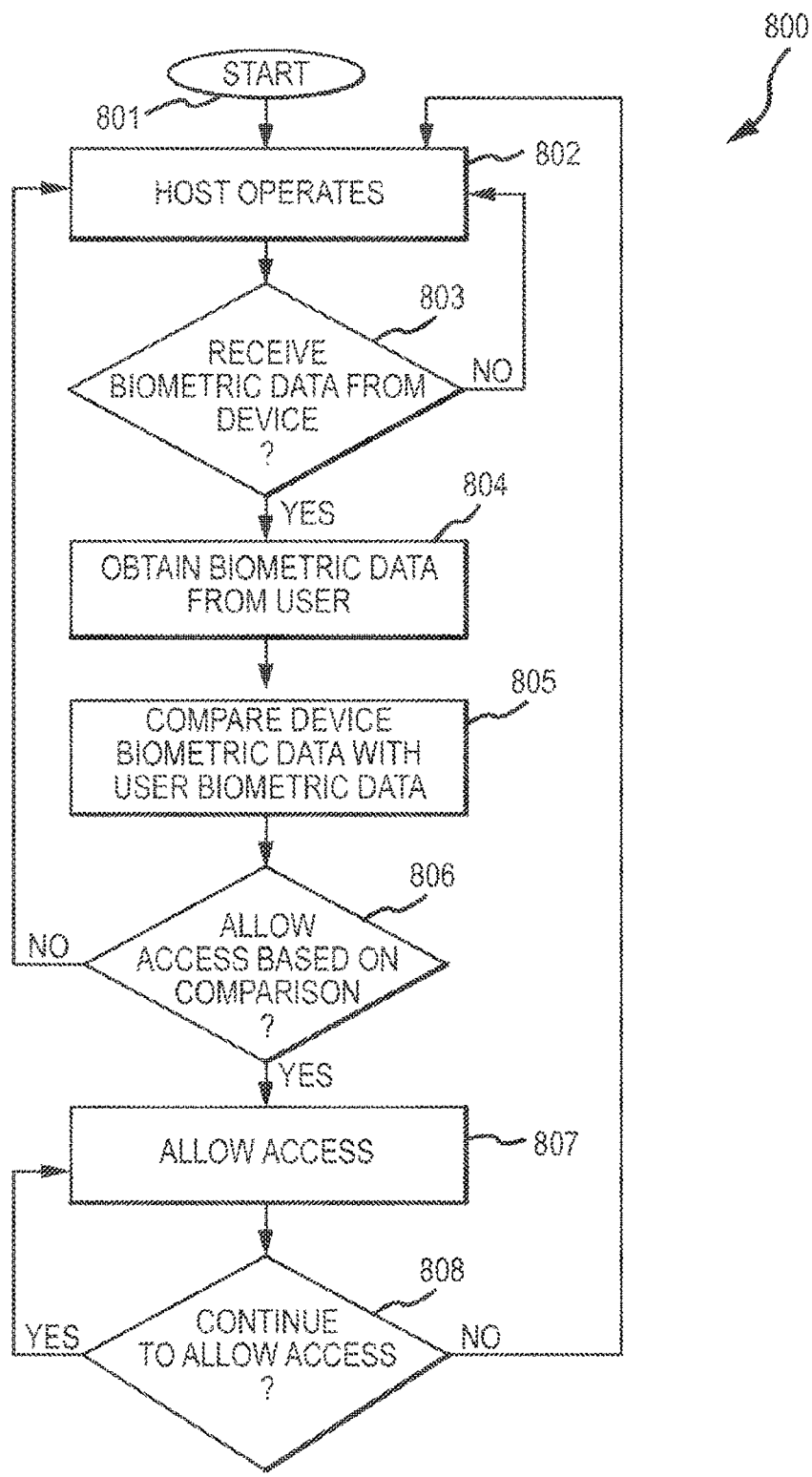
FIG. 8 is a flow chart illustrating a seventh example method for wireless pairing and communication between devices using biometrics. This method may be performed by the host of FIG. 1.

FIG. 8 illustrates a seventh example method 800 for wireless pairing and communication between devices using biometrics. The method 800 may be performed by the host 101 of FIG. 1. The flow begins at block 801 and proceeds to block 802 where the host operates. The flow then proceeds to block 803 where the host determines whether or not biometric data is received from a device. If so, the flow proceeds to block 804. Otherwise, the flow returns to block 802 where the host continues to operate.

At block 804, after the host 101 has determined that biometric data is received from a device, the host obtains biometric data from a user. The flow then proceeds to block 805 where the host compares the biometric data received from the host to the biometric data received from the user. The flow then proceeds to block 806 where the host determines whether or not to allow access to data of the host based on the comparison. If so, the flow proceeds to block 807. Otherwise, the flow returns to block 802 and the host continues to operate.

At block 807, after the host 101 determines to allow access to data of the host based on the comparison, the host allows the device to access the data. The flow then proceeds to block 808.

At block 808, the host 101 determines whether or not to continue to allow the device to access the data. If so, the flow returns to block 807 and the host continues to allow the device to access the data. Otherwise, the flow returns to block 802 and the host continues to operate.

Figure 9:
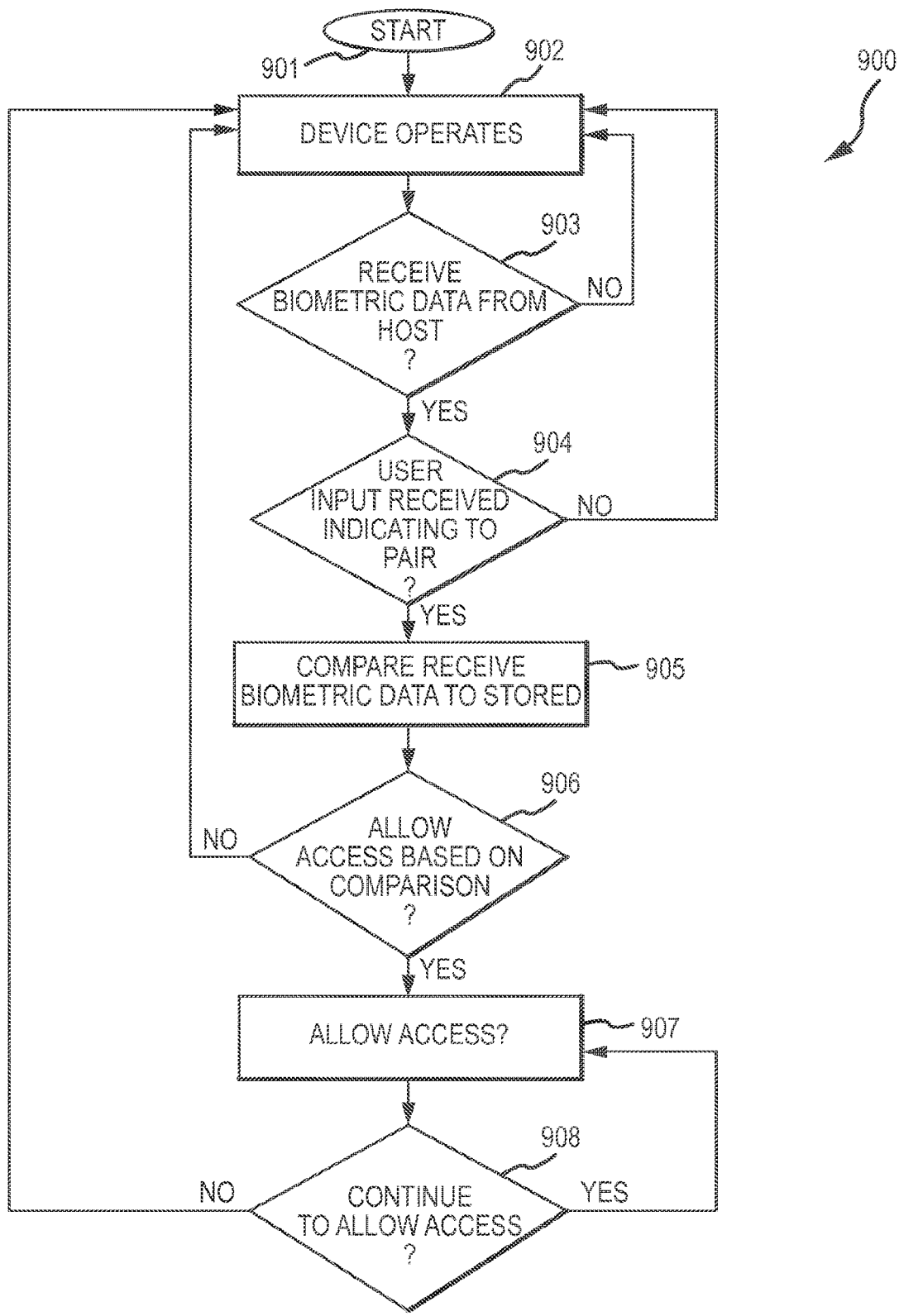
FIG. 9 is a flow chart illustrating an eighth example method for wireless pairing and communication between devices using biometrics. This method may be performed by the device of FIG. 1.

FIG. 9 illustrates an eighth example method 900 for wireless pairing and communication between devices using biometrics. The method 900 may be performed by the device 102 of FIG. 1. The flow begins at block 901 and proceeds to block 902 where the device operates. The flow then proceeds to block 903 where the device determines whether or not biometric data is received from a host. If so, the flow proceeds to block 904. Otherwise, the flow returns to block 902 where the device continues to operate.

At block 904, after the device 102 has determined that biometric data is received from a host, the device determines whether or not user input is received indicating to pair with the host. Such user input may be received in response to a prompt presented by the device indicating that the host is attempting to pair. If the device determines that the user input is received, the flow proceeds to block 905. Otherwise, the flow returns to block 902 where the device continues to operate.

At block 905, the device 102 compares the received biometric data to biometric data stored by the device. The flow then proceeds to block 906 where the device determines whether or not to allow access to data of the device based on the comparison. If so, the flow proceeds to block 907. Otherwise, the flow returns to block 902 and the device continues to operate.

At block 907, after the device 102 determines to allow access to data of the device based on the comparison, the device allows the host to access the data. The flow then proceeds to block 908.

At block 908, the device 102 determines whether or not to continue to allow the host to access the data. If so, the flow returns to block 907 and the device continues to allow the host to access the data. Otherwise, the flow returns to block 902 and the device continues to operate.

Figure 10:
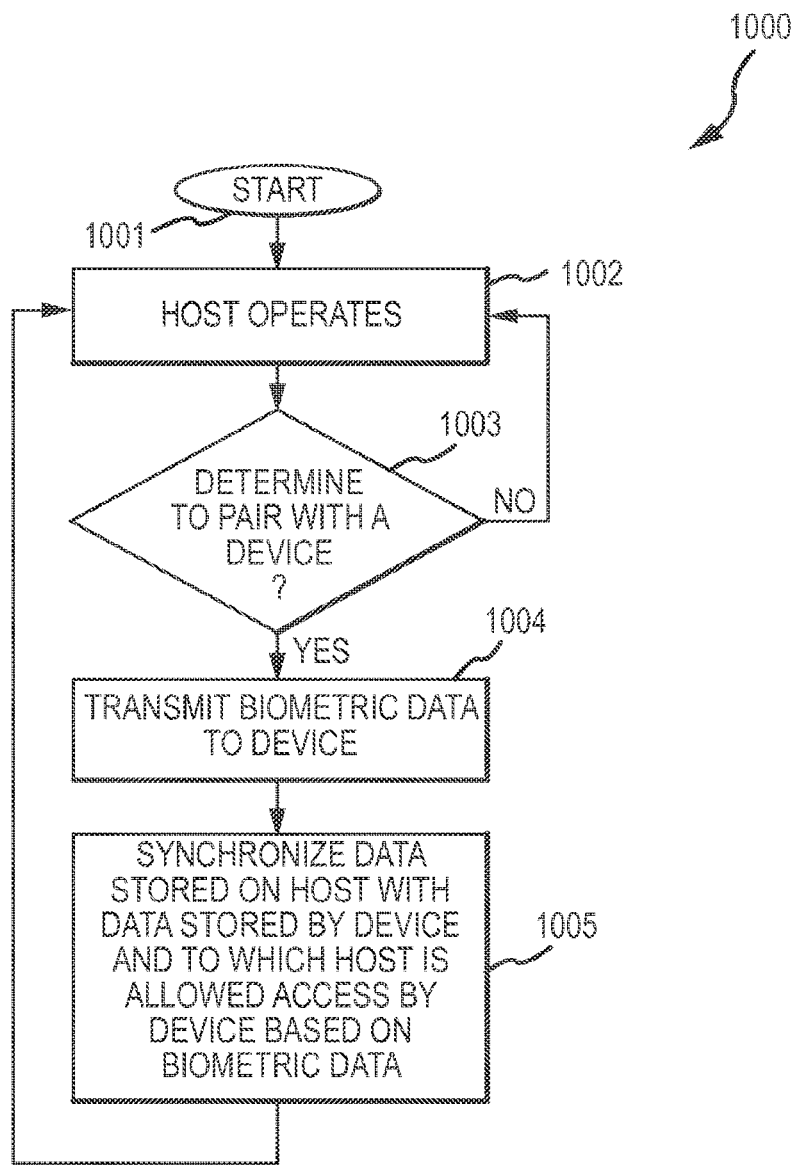
FIG. 10 is a flow chart illustrating a ninth example method for wireless pairing and communication between devices using biometrics. This method may be performed by the host of FIG. 1.

FIG. 10 illustrates a ninth example method 1000 for wireless pairing and communication between devices using biometrics. The method 1000 may be performed by the host 101 of FIG. 1. The flow begins at block 1001 and proceeds to block 1002 where the host operates. The flow then proceeds to block 1003 where the host determines whether or not to pair with a device. If so, the flow proceeds to block 1004. Otherwise, the flow returns to block 1002 where the host continues to operate.

At block 1004, after the host 101 determines to pair with a device, the host transmits biometric data to the device. The flow then proceeds to block 1005 where the host synchronizes data stored on the host with data stored by the device to which the device allows access based on the transmitted biometric data. Such synchronized data may include one or more sets of music files, movies files, document files, spreadsheet files, presentation files, and so on. The flow then returns to block 1002 where the host continues to operate.

Figure 11:
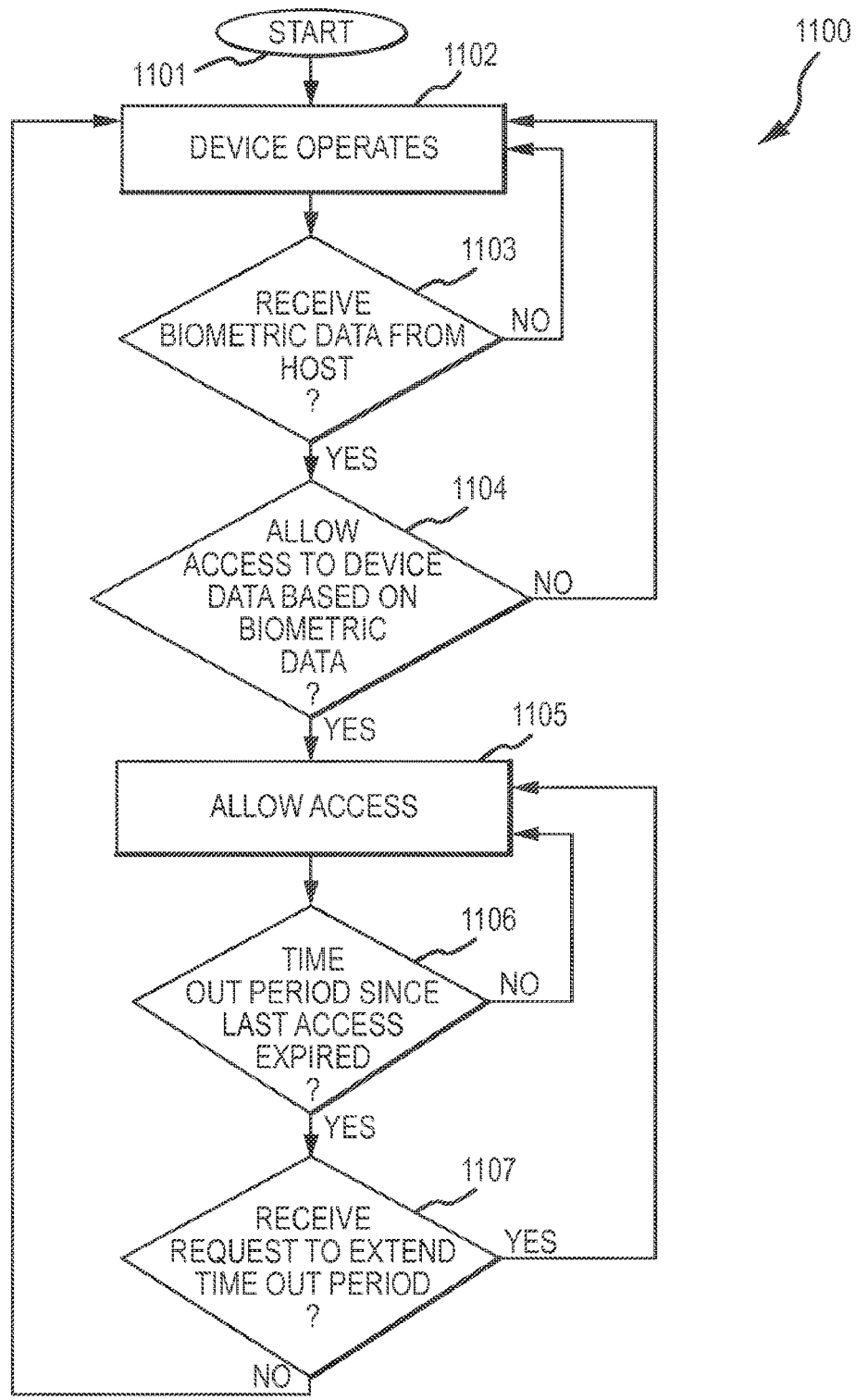
FIG. 11 is a flow chart illustrating a tenth example method for wireless pairing and communication between devices using biometrics. This method may be performed by the device of FIG. 1.

FIG. 11 illustrates a tenth example method 1100 for wireless pairing and communication between devices using biometrics. The method 1100 may be performed by the device 102 of FIG. 1. The flow begins at block 1101 and proceeds to block 1102 where the device operates. The flow then proceeds to block 1103 where the device determines whether or not biometric data is received from a host. If so, the flow proceeds to block 1104. Otherwise, the flow returns to block 1102 where the device continues to operate.

At block 1104, after the device 102 has determined that biometric data is received from a host, the device determines whether or not to allow access to data of the device based on the received biometric data. If so, the flow proceeds to block 1105. Otherwise, the flow returns to block 1102 and the device continues to operate.

At block 1105, after the device 102 determines to allow access to data of the device based on the received biometric data, the device allows the host to access the data. The flow then proceeds to block 1106.

At block 1106 the device 102 determines whether or not a timeout period (such as forty seconds) has expired since the host last accessed the data to which the device allowed access. If so, the flow proceeds to block 1107. Otherwise, the flow returns to block 1105 and the device continues to allow the host access to the data.

At block 1107, after the device 102 determines that the timeout period has expired since the host last accessed the data to which the device allowed access, the device determines whether or not a request to extend the timeout period (such as from a user of the device or a user of the host in response to a presented prompt indicating that the timeout period is about to expire). If so, the device extends the timeout period (such as by a period of time equaling the original timeout period) and the flow proceeds to block 1105 where the device continues to allow the host access to the data. Otherwise, the flow returns to block 1102 and the device continues to operate.

Figure 12:
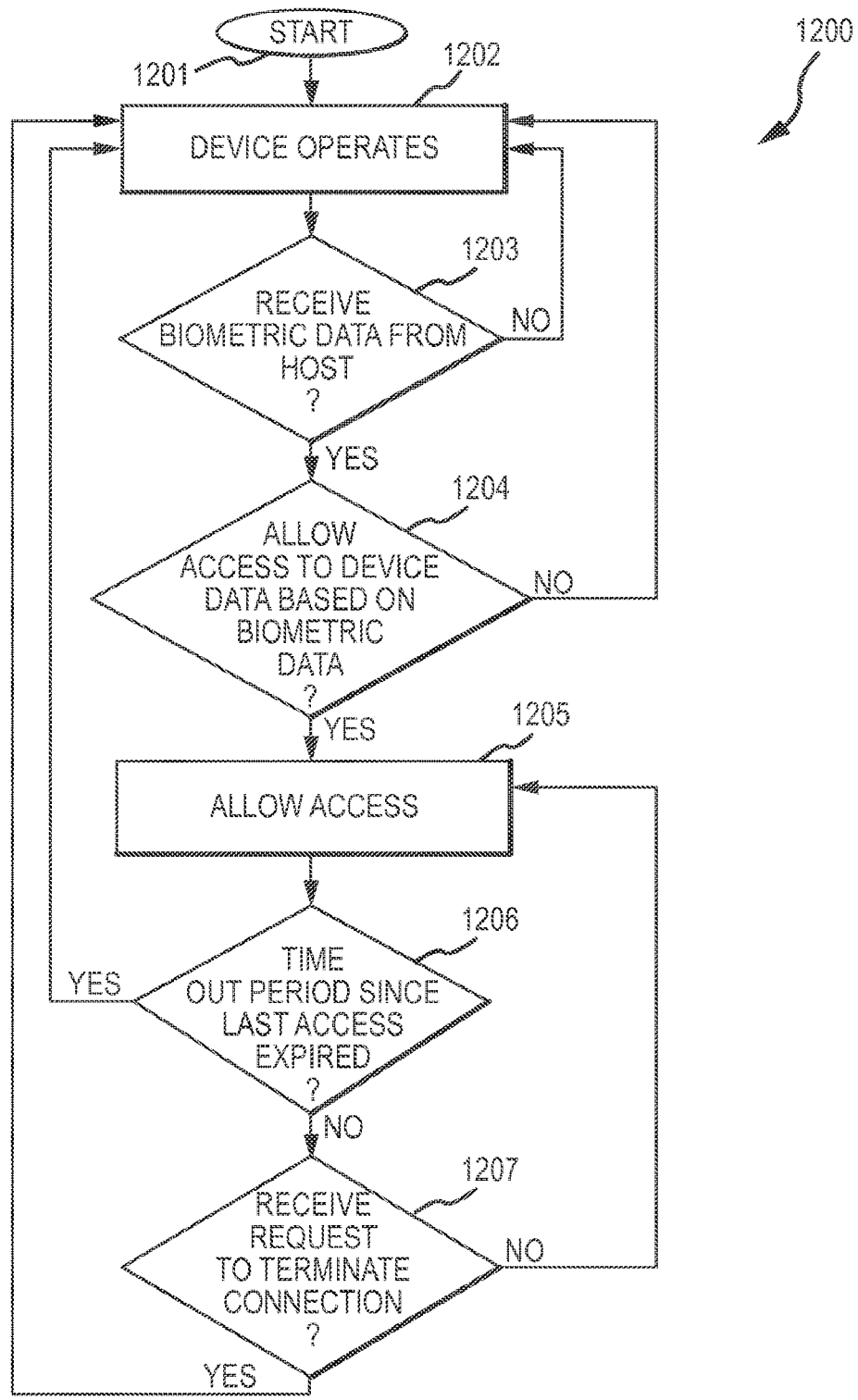
FIG. 12 is a flow chart illustrating an eleventh example method for wireless pairing and communication between devices using biometrics. This method may be performed by the device of FIG. 1.

FIG. 12 illustrates an eleventh example method 1200 for wireless pairing and communication between devices using biometrics. The method 1200 may be performed by the device 102 of FIG. 1. The flow begins at block 1201 and proceeds to block 1202 where the device operates. The flow then proceeds to block 1203 where the device determines whether or not biometric data is received from a host. If so, the flow proceeds to block 1204. Otherwise, the flow returns to block 1202 where the device continues to operate.

At block 1204, after the device 102 has determined that biometric data is received from a host, the device determines whether or not to allow access to data of the device based on the received biometric data. If so, the flow proceeds to block 1205. Otherwise, the flow returns to block 1202 and the device continues to operate.

At block 1205, after the device 102 determines to allow access to data of the device based on the received biometric data, the device allows the host to access the data. The flow then proceeds to block 1206.

At block 1206 the device 102 determines whether or not a timeout period (such as forty seconds) has expired since the host last accessed the data to which the device allowed access. If so, the flow returns to block 1202 and the device continues to operate. Otherwise, the flow proceeds to block 1207.

At block 1207, after the device 102 determines that the timeout period has not expired since the host last accessed the data to which the device allowed access, the device determines whether or not a request to terminate the connection between the device and the host has been received (such as from the user). If not, the flow returns to block 1205 and the device continues to allow access. Otherwise, the flow returns to block 1202 and the device continues to operate.

Returning to FIG. 1, in a first example, a user may have a laptop computer and a smart phone. The user may have configured both devices to store the user's biometric data and to automatically pair and synchronize the user's music folder whenever the laptop computer and smart phone are in wireless communication range of each other. As such, when the user moves the smart phone in wireless communication range of the laptop computer, the smart phone may transmit the stored biometric information for the user to the laptop computer. The user may then have full access to the data on both the smart phone and the laptop computer (via the smart phone). Further, the smart phone may be configured to automatically synchronize the user's music folder on the smart phone with the user's music folder on the laptop computer without any user input.

In a second example, a user may wish to share a file on the user's tablet computer with a friend's tablet computer. The user and friend may have configured the two tablet computers to pair when they are in wireless range of each other and the friend may have configured the friend's tablet computer to provide the user read/write access to the friend's tablet computer via the user's tablet computer. As such, when the user moves the user's tablet computer within wireless range of the friend's tablet computer, the user's tablet computer may prompt the user to pair. The user may 'swipe' a touch screen of the user's tablet computer to initiate the pairing and then have full access to the data on the user's tablet computer as well as read/write access to the friend's tablet computer. The user may then transfer the file that the user wishes to share from the user's tablet computer to the friend's tablet computer.

In a third example, a user may be borrowing a smart phone from a coworker and may want to obtain a document file from the user's portable storage device. The user's portable storage device may be configured to allow the user access to the user's files from other computers or such devices. As such, when the user moves the coworker's smart phone into wireless range of the user's portable storage device, the coworker's smart phone may prompt the user to pair with the user's portable storage device. The user may 'swipe' a touch screen of the coworker's smart phone to initiate the pairing (as well as capture the user's fingerprint to transmit to the user's portable storage device as part of the pairing) and then have full access to the data on the user's portable storage device as well as 'drop box' access to the coworker's smart phone. The user may then transfer the document file from the user's portable storage device to a drop box location on the coworker's smart phone via the coworker's smart phone.

In a fourth example, a user may be utilizing a friend's tablet computer and may need to review a presentation file stored on a coworker's computer. The coworker's computer may be configured to allow the user to read and/or write to a non-secure data storage area of the coworker's computer which happens to store the presentation file. The friend's tablet computer may be configured to allow the user 'drop box' access to storage of the friend's tablet computer via the friend's tablet computer itself. As such, when the user moves the friend's tablet computer into wireless range of the coworker's computer, the friend's tablet computer and the coworker's computer may both present a prompt to pair. The user may 'swipe' a touch screen of the friend's tablet computer and a touch screen of the coworker's computer (which also captures the user's fingerprint to use in the pairing) and then have read/write access to the non-secure data storage area of the coworker's computer as well as 'drop box' access to the friend's tablet computer. The user may then transfer the presentation file from the coworker's computer to a drop box area of the friend's tablet computer via the friend's tablet computer.

In a fifth example, a user may be utilizing a borrowed tablet computer and may wish the user interface of the borrowed tablet computer to resemble the user interface of the user's own tablet computer. The user's tablet computer may be configured to allow the user access to the configuration files of the user's tablet computer from other computers. As such, when the user moves the borrowed tablet computer into wireless range of the user's tablet computer, the borrowed tablet computer may prompt the user to pair. The user may 'swipe' a touch screen of the borrowed tablet computer to initiate the pairing (as well as capture the user's fingerprint to transmit to the user's tablet computer as part of the pairing). The borrowed tablet computer may obtain the configuration files from the user's tablet computer and then prompt the user to reconfigure the borrowed tablet computer based on the obtained configuration files. Upon receiving confirmation from the user, the borrowed tablet computer may reconfigure itself accordingly.

In a sixth example, a user may have a smart phone and a data storage area in a cloud computing storage system. The user may have configured the smart phone to automatically pair with the cloud computing storage system in order to backup video files stored on the smart phone to a private storage area provided by the cloud computing storage system for the user. As such, whenever the smart phone is connected to the Internet the smart phone may pair with the user's data storage area of the cloud computing storage system and backup the video files stored on the smart phone.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A system for wireless pairing and communication between devices using biometrics, the system comprising:
  a device, comprising:
    a processing unit;
    a wireless communication component coupled to the processing unit;
    a touchscreen display coupled to the processing unit;
    a biometric sensor coupled to the processing unit; and
    a non-transitory storage medium storing instructions executable by the processing unit to cause the device to:
      display a pairing prompt on the touchscreen display when a host and the device are in wireless communication range of each other;
      capture biometric data using the biometric sensor when a user initiates pairing using the touchscreen display; and
      receive a configuration file from the host based at least on the captured biometric data, wherein:
        the configuration file specifies an arrangement of one or more navigation items in a user interface of the host; and
        the device reconfigures, based at least in part on the configuration file, an arrangement of one or more navigation items in a user interface of the device according to the arrangement of the one or more navigation items in the user interface of the host, thereby causing a configuration of the device to resemble the configuration of the host.

2. The system as in claim 1, wherein the configuration file further comprises one or more of:
  one or more background images;
  one or more sound settings;
  one or more alert settings;
  one or more browser bookmarks; or
  the one or more navigation items.

3. The method of claim 1, wherein the at least one navigation item comprises an icon.

4. A system for wireless pairing and communication between devices using biometrics, comprising:
  a device comprising:
    a processing unit;

a wireless communication component coupled to the processing unit;

a user interface component configured to captured biometric data; and a non-transitory storage medium storing instructions executable by the processing unit to cause the device to:

capture biometric data using the user interface component when a user initiates pairing with a host;

transmit the biometric data to the host utilizing the wireless communication component; and receive a configuration file associated with a configuration of the host based at least on the transmitted biometric data, wherein:

the configuration file specifies an arrangement of one or more navigation items in a user interface of the host; and in response to receiving the configuration file, the device reconfigures an arrangement of one or more navigation items in a user interface of the device to be substantially the same as the arrangement of the one or more navigation items in the user interface of the host.

5. The system of claim 4, wherein the configuration file further comprises one or more of:
a background image;
an additional display setting;
a sound setting;
a language setting;
a default setting;
an alert setting;
a browser bookmark; or
at least one of the one or more navigation items.

6. The system of claim 2, wherein the processing unit modifies the biometric data before transmission to the host.

7. The system of claim 6, wherein the modification of the biometric data comprises at least one of hashing the biometric data or encrypting the biometric data.

8. The system of claim 2, wherein the biometric data comprises at least one of:
a fingerprint;
a palm print;
a handprint;
a facial image;
a retinal image; or
a voice signature.

9. The system of claim 2, wherein the user interface component comprises a touchscreen display coupled to the processing unit, the touch screen display including a fingerprint reader, and wherein the processing unit executes instructions to:
display a pairing prompt on the touchscreen display when the host and the device are in wireless communication range of each other;
capture fingerprint data using the fingerprint reader when the user initiates pairing by pressing a finger on the pairing prompt displayed on the touchscreen display.

10. The system of claim 2, wherein the user interface component comprises a microphone and the processing unit executes instructions to:
receive a pairing request using the microphone; and
capture a voice signature when the user initiates pairing with the pairing request.

11. The system of claim 2, wherein the user interface component comprises a fingerprint reader and the processing unit executes instructions to capture a fingerprint using the fingerprint reader when the user initiates pairing.

12. The system of claim 2, wherein the host comprises a first smart phone and the device comprises a second smart phone.

13. A method for wireless paring and communication between devices using biometrics, the method comprising:
determining, utilizing a device, to pair with a host;
capturing biometric data, utilizing a user interface component in the device, when initiating pairing with the host;
transmitting, utilizing a wireless communication component in the device, the biometric data to the host;
receiving, by the device, a configuration file associated with a configuration of the host based at least on the transmitted biometric data, the configuration file specifying an arrangement of one or more navigation items in a user interface of the host; and
changing, by the device, based at least in part on the configuration file, an arrangement of one or more navigation items in a user interface of the device to be substantially the same as the arrangement of the one or more navigation items in the user interface of the host.

14. The method of claim 13, wherein the configuration file further comprises one or more of:
a background image;
a display setting;
a sound setting;
a language setting;
a default setting;
an alert setting;
a browser bookmark; or
at least one of the one or more navigation items.

15. The method of claim 13, wherein the biometric data comprises at least one of:
a fingerprint;
a palm print;
a handprint;
a facial image;
a retinal image; or
a voice signature.

16. The method of claim 13, wherein the host and the device comprise at least a portion of a cloud computing system and the biometric data is transmitted from the device to the host utilizing a cloud computing server and the configuration file is received by the device from the host utilizing the cloud computing server.

17. The method of claim 13, further comprising modifying the biometric data prior to transmitting the biometric data to the host.

18. The method of claim 17, wherein modifying the biometric data comprises hashing the biometric data.

19. The method of claim 17, wherein modifying the biometric data comprises encrypting the biometric data.

20. The method of claim 13, wherein determining, utilizing the device, to pair with the host and capturing biometric data, utilizing the user interface component in the device, when initiating pairing with the host comprises:
displaying a pairing prompt on a touchscreen display when the host and the device are in wireless communication range of each other; and
capturing fingerprint data utilizing a fingerprint reader associated with the touchscreen display when the user initiates pairing by pressing a finger on the pairing prompt displayed on the touchscreen display.

21. The method of claim 13, wherein determining, utilizing the device, to pair with the host and capturing biometric data, utilizing the user interface component in the device, when initiating pairing with the host comprises:

receiving, utilizing a microphone, a pairing request from a user; and capturing a voice signature when the user initiates pairing with the pairing request.

22. The method of claim 13, wherein determining, utilizing the device, to pair with the host and capturing biometric data, utilizing the user interface component in the device, when initiating pairing with the host comprises:

capturing, utilizing a fingerprint reader, a fingerprint when a user initiates pairing.

* * * * *